Oct. 13, 1936.   H. B. JESPERSEN   2,057,100
APPARATUS FOR TREATING LIQUIDS WITH GASES
Filed June 26, 1935
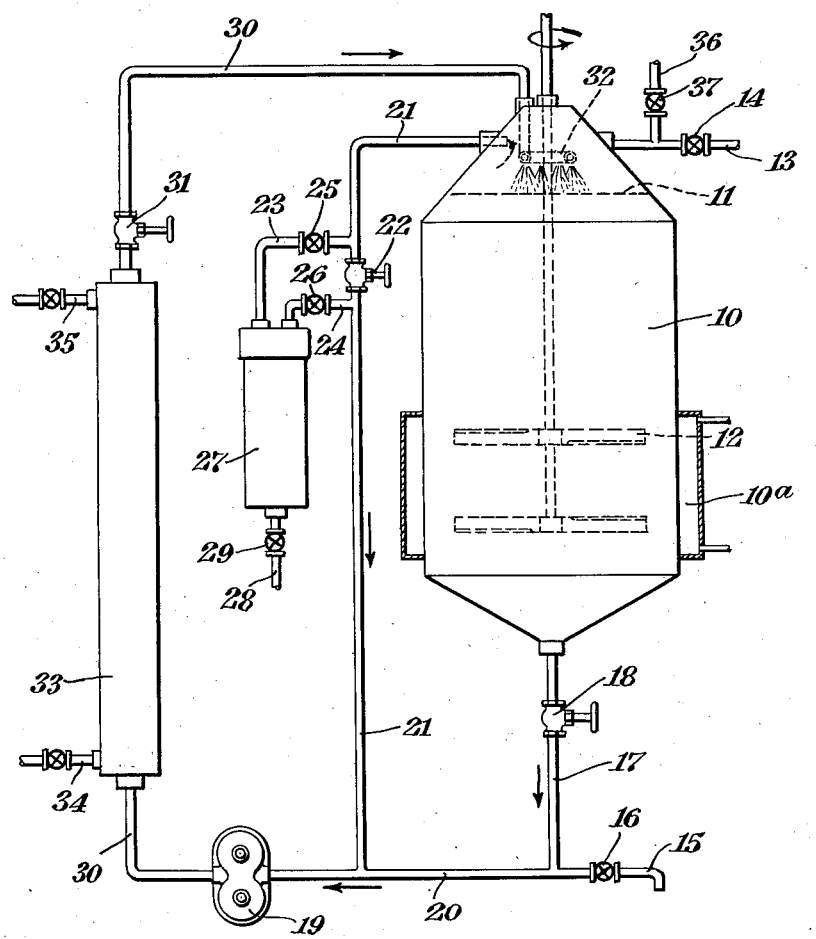
INVENTOR
Holger B. Jespersen
BY
Knight
ATTORNEYS Patented Oct. 13, 1936

2,057,100

UNITED STATES PATENT OFFICE 2,057,100

APPARATUS FOR TREATING LIQUIDS WITH GASES

Holger B. Jespersen, Matawan, N. J., assignor to Hanson-Van Winkle-Munning Company, Matawan, N. J., a corporation of New Jersey Application June 26, 1935, Serial No. 28,411

9 Claims. (Cl. 261—29)

This invention relates in general to apparatus suitable for the hydrogenation of oils, and other operations in which it is desired to subject liquids and gases to reaction, either alone or in the presence of a catalyst favoring the desired reaction. In such operations the presentation of the different materials to each other has an important effect upon the efficiency attained. Since the gas tends to rise out of the liquid, and the catalyst frequently tends to settle out of the liquid, it is usually desirable that some form of agitation be employed and means be provided for continuously reintroducing the gas into the liquid. It is also important in most cases to raise the temperature of the reacting materials above that of the atmosphere, and to maintain it within a preferred temperature range. Another feature which is sometimes important is the application of pressure to the reacting materials.

An important object of my present invention is to provide an apparatus capable of meeting such requirements as above mentioned, and to have the various factors which influence the reaction subject to the ready control and adjustment of the operator.

In the attainment of the purposes of the present invention, I employ a pump into which the separately controlled gas and liquid conduits lead, and from which the conduit for the mixed gas and liquid delivers the mixture at a regulated rate. In its preferred form, the gas and liquid may be drawn from a common container, the gas from an upper portion thereof and the liquid from a lower portion thereof, through their respective conduits, each provided with a control valve, and the mixture of gas and liquid is delivered by the pump through a valve-controlled mixture conduit back into the receptacle from which the two were withdrawn, thus maintaining a continuous or intermittent circulation and mixing of the gas and liquid in any desired proportions, and subjecting the mixture in the mixture conduit to any desired pressure, as determined by the setting of the valves in the respective conduits. These and other features of the apparatus will be more clearly understood by reference to a specific example and one embodiment thereof, illustrated in the accompanying drawing.

Said drawing represents in elevational diagram the essential parts of an apparatus for treating liquids with gases, in the presence of a catalyst, in accordance with the present invention.

Referring in detail to said drawing, 10 indicates a receptacle or container for liquid which may be maintained therein up to the level indicated by the dotted line 11, and above this level may contain gas. In the use of the apparatus for hydrogenating oils, it will be understood that suitable catalytic material, such as finely divided nickel, may be suspended in the oil, and the mixture kept in a state of agitation by means of the rotary agitators 12. Hydrogen or other gas may be introduced through an inlet 13 which is controlled by a valve 14. The liquid and catalyst may be introduced (as will be explained later) from a pipe or conduit 15 containing valve 16 through the liquid conduit 17, which communicates with the bottom of the container 10 and in which is located a valve 18. After the apparatus has been charged, the valve 16 is closed. A pump 19 draws liquid from the lower portion of container 10 through the liquid conduit 17 and the branch 20 thereof, and at the same time may draw gas from the upper portion of the receptacle 10 through the gas passage 21, which joins the branch 20 of the liquid conduit 17. A valve 22 is located in the gas passage or conduit 21. By-passes 23 and 24, controlled by their respective valves 25 and 26, lead around the valve 22 through an auxiliary unit 27, which may be a filter, heater, condenser, absorber, drier, or other special treating unit for the gas coming from the top of the container 10. In many operations the gas treating unit 27 is disconnected by closing the by-pass valves 25 and 26 so that the gas flows directly from the top of the container 10 through the pipe 21 under the control of the valve 22 into the liquid branch pipe 20 on its way to the pump 19. The treating unit 27 may be drained through a pipe 28 which is controlled by a valve 29.

The pump 19, which receives the mixture of liquid and gas from the pipe lines or conduits 17—20 and 21, delivers the mixture through the mixture conduit 30 which leads through a control valve into the top of receptacle 10. Whether this pipe or conduit 30 terminates above or below the liquid level 11 in the receptacle or container 10 is optional, depending upon the particular use to which the apparatus is to be put, as the mixture may be discharged into the gas space where it will contact with fresh gas, or it may be discharged below the level of the liquid so that the gas may rise through the liquid and contact therewith on its ascent to the gas space. For purposes of illustration, however, I have shown the pipe or conduit 30 terminating in a spray head 32 above the liquid level 11. A heating or cooling means, such as, for example, a jacket 10a, may be applied to the container 10. Local heating or cooling means may be applied to the mixture pipe 30, or an enlargement thereof, for heating or cooling fluids or electric current, illustrated by way of example as a steam jacket 33 controlled by the valved pipes 34, 35.

Referring again to the pipe 13, by which hydrogen or other gas may be introduced into the container 10, it will be noted that a branch pipe 36, provided with a control valve 37, leads into the pipe 13. This branch pipe 36 is normally kept closed by the valve 37, but may be employed when desired for applying pressure or vacuum to the container 10. It constitutes one convenient way of charging the apparatus by vacuum. Assuming, for example, the apparatus is completely empty and the valves 14, 22, 25, 26, and 31 closed, whereas valves 16, 18, and 37 are open, the application of suction to the branch pipe 36 will evacuate the system so that a mixture of liquid and catalyst, such as oil and finely divided nickel, may be introduced through the supply pipe 15 until it has been brought to the desired level within the main container 10. Valves 16 and 37 may then be closed and valve 14 opened to permit introduction of gas, such as hydrogen, into the upper portion of the apparatus. Valve 14 may then be closed so that the charge of gas, liquid and catalyst is confined within a closed system.

Assuming first that the by-passes 23 and 24 are shut off by the closing of their valves 25 and 26, and that valves 22 and 31 are fully open, with valve 18 only partly open, the operation of pump 19 may cause a flow of liquid from the bottom of the container 10 and gas from the top thereof, through the respective pipes 17—20 and 21, through the pump 19 and back into the top of the container 10 by way of the pipe 30. If valve 22 is closed, and valve 18 fully open, the operation of pump 19 will serve to circulate liquid with no gas, whereas if valve 18 is closed and valve 22 is open, the operation of pump 19 will serve to circulate gas and no liquid. By regulating the extent of opening of the valves 18 and 22, with respect to each other, the proportions of liquid to gas may readily be adjusted to any desired ratio. When the by-pass through valves 25 and 26 is open and valve 22 is closed, similar regulation of the proportions of liquid to gas may be obtained by regulating either or both of the valves 25 and 26 with respect to the valve 18. Partial by-passing of the gas may be obtained by proper setting of valve 22 with respect to the setting of valve 25 and 26. Higher vacuum in treating unit 27 may be obtained by closing valve 22, partially closing valve 25 and opening valve 26. By adjusting the setting of valve 31, the compression upon the mixture of liquid and gas between the pump 19 and the valve 31 may be regulated to any desired value within the capacity of the apparatus. The local heating or cooling of the mixture of liquid and gas between pump 19 and valve 31 may be regulated by the supply of heating or cooling fluid to the jacket 33 under the control of the valves in pipes 34 and 35. As the gas withdrawn from the upper portion of the container 10 through the pipe 21 may be by-passed through the auxiliary treating unit 27, either partially or completely, by closing valve 22 and opening valves 25 and 26 to the extent necessary, it may thus be subjected to separate heating, cooling, drying, washing, condensation, absorption, or other operation desired, before it is brought into contact with the liquid where the pipe 21 joins the branch liquid pipe 20.

The application of the apparatus to the hydrogenation of oils, and similar treatments, will be apparent from the above description. Hydrogenatable oil containing the proper catalyst may be kept in a state of agitation by driving the agitators 12 in the manner diagrammatically represented by the arrow surrounding the shaft thereof. The temperature of the oil may be raised to the desired point by heating the mixture of hydrogen and oil with the suspended catalyst, in the main container 10 by means of the temperature control 10a, and as the mixture passes through the pipe 30, or the enlargement thereof, the temperature may be locally raised or lowered by use of the jacket 33. Since the hydrogenation of oil represents an exothermic chemical reaction, and the system may be sealed against the atmosphere during the treatment of a charge of oil and hydrogen, the temperature rise, initiated by the application of heat in one or both of the jackets 10a and 33, and continued by the generation of chemical heat from the reaction, will tend to elevate the pressure within the closed system. Such temperature and pressure elevation may be readily kept within reasonable limits by the supply of cooling liquid through either or both of these jackets at such rate or temperature as may be necessary. The particular action of a pump such as the gear pump 19 upon the mixture of oil, hydrogen and catalyst, is believed to be important in the hydrogenation of oils because of the particularly favorable presentation of the reacting materials and the catalyst thereby obtained. The gear pump generates a high local compression due to the meshing of the gears, and the actual compression of the mixture between the pump 19 and the valve 31 may be brought up to quite substantial values by closing the valve 31 to the necessary extent. Since this compression is maintained within a comparatively small portion of the apparatus, which may be readily constructed to have great strength, and since this local portion of the charge may be subjected to quite high temperatures without simultaneously heating the entire charge to the same extent, the design of the apparatus lends itself to highly specialized treatments with comparative economy of construction cost. Considerable cooling may be permitted between the valve 31 and the point of delivery of the mixture into the main receptacle 10, and likewise a considerable reduction of pressure may occur between these points. Thus the main tank or container and the greater portion of the liquid contained therein need not be exposed to as high a temperature or pressure as can readily be safely maintained between the pump 19 and the valve 31.

The finished product may be drained from the system through the pipe 15 by opening the valve 16. This may, of course, be facilitated by maintaining the temperature above the melting point of the hydrogenated product and, if desired, by applying pressure by way of the hydrogen pipe 13 or the vacuum pipe 36. Cleaning of the apparatus can obviously be accomplished by circulation of a cleaning liquid under the influence of pressure supplied externally or by means of the pump 19 and aided, if desired, by the application of heat in the jacket 33.

The example above described is believed to illustrate in principle the essential features of the invention. It is not necessary that all of the novel features be always present or used, or that any of the parts be made with the particular details of construction herein illustrated.

I claim:—

1. Apparatus for treating liquids with gases, comprising in combination a container for liquid and gas, a pump, a liquid conduit leading from the lower portion of said container to said pump, a gas conduit leading from an upper portion of said container to said pump, a mixture conduit for mixed liquid and gas leading from said pump, and a control valve in said mixture conduit for varying the pressure developed therein by said pump.

2. Apparatus for treating liquids with gases, comprising in combination a container for liquid and gas, a pump, a liquid conduit from a lower portion of said container to said pump, a gas conduit from an upper portion of said container to said pump, control valves in said gas and liquid conduits for adjusting the proportions of gas and liquid admitted to said pump, and a conduit for mixed liquid and gas leading from said pump.

3. Apparatus for treating liquids with gases, comprising in combination a container for liquid and gas, a pump, a liquid conduit leading from the lower portion of said container to said pump, a gas conduit leading from an upper portion of said container to said pump, control valves in said conduits for varying the proportions of the liquid and the gas entering said pump from said gas and liquid conduits, and a mixture conduit for leading the mixed gas and liquid from said pump back into said container.

4. Apparatus for treating liquids with gases, comprising in combination a container for liquid and gas, a pump, a liquid conduit leading from a lower portion of said container to said pump, a gas conduit leading from an upper portion of said container to said pump, control valves in said conduits for varying the proportions of the liquid and the gas entering said pump from said gas and liquid conduits, a mixture conduit for leading the mixed gas and liquid from said pump back into said container, and a control valve in said mixture conduit for controlling the pressure developed therein by said pump.

5. Apparatus for treating liquids with gases, comprising in combination a pump, a liquid conduit leading to said pump, a gas conduit leading to said pump, a mixture conduit for mixed liquid and gas leading from said pump, a control valve in said mixture conduit for varying the pressure developed therein by said pump, and means for locally regulating the temperature of the mixture in said mixture conduit between said pump and said control valve.

6. Apparatus for treating liquids with gases, comprising in combination a main receptacle for liquid and gas, a pump having its intake in communication with said main receptacle to withdraw liquid and gas therefrom, a return conduit leading from said pump to said main receptacle for returning thereto the mixture of gas and liquid, and a control valve in said return conduit for regulating the pressure developed in said conduit between said pump and said control valve.

7. Apparatus for treating liquids with gases, comprising in combination a main receptacle for liquid and gas, a pump having its intake in communication with said main receptacle to withdraw liquid and gas therefrom, a return conduit leading from said pump to said main receptacle for returning thereto the mixture of gas and liquid, and a temperature regulating means associated with said return conduit for locally varying or maintaining the temperature of the mixture passing therethrough.

8. Apparatus for treating liquids with gases, comprising in combination a main receptacle for liquid and gas, a pump, separate liquid and gas conduits leading from said main receptacle to said pump, a gas-treating unit associated with said gas conduit for producing a physical or chemical change in the gas after it leaves said main receptacle and before it meets the liquid entering said pump, and a mixture conduit for the mixture of gas and liquid delivered by said pump.

9. Apparatus for treating liquids with gases, comprising in combination a main receptacle for liquid and gas, a pump, a valve-controlled liquid conduit leading from said main receptacle to said pump, a gas conduit leading from said main receptacle to said pump, a control valve in said gas conduit, a gas-treating unit associated with said gas conduit in the form of a by-pass around said gas control valve, and valve means for controlling the flow of the gas through said gas-treating unit.

HOLGER B. JESPERSEN.